(12) United States Patent
Reddy

(10) Patent No.: US 10,414,968 B2
(45) Date of Patent: *Sep. 17, 2019

(54) SETTABLE, FORM-FILLING LOSS CIRCULATION CONTROL COMPOSITIONS COMPRISING IN SITU FOAMED CALCIUM ALUMINATE CEMENT SYSTEMS AND METHODS OF USING THEM

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,466

(22) Filed: Jan. 24, 2019

(65) Prior Publication Data

US 2019/0225863 A1 Jul. 25, 2019

Related U.S. Application Data

(63) Continuation of application No. 15/879,179, filed on Jan. 24, 2018, now Pat. No. 10,259,985.

(51) Int. Cl.
| | |
|---|---|
| *C09K 8/487* | (2006.01) |
| *C09K 8/473* | (2006.01) |
| *C04B 28/06* | (2006.01) |
| *C04B 7/32* | (2006.01) |
| *E21B 33/13* | (2006.01) |

(52) U.S. Cl.
CPC ............... *C09K 8/487* (2013.01); *C04B 7/32* (2013.01); *C04B 28/06* (2013.01); *C09K 8/473* (2013.01); *E21B 33/13* (2013.01)

(58) Field of Classification Search
CPC ........... C04B 28/06; C04B 7/32; C09K 8/487; C09K 8/473; E21B 33/13
See application file for complete search history.

(56) References Cited

U.S. PATENT DOCUMENTS

| | | | | |
|---|---|---|---|---|
| 4,450,010 A ‡ | 5/1984 | Burkhalter | .............. | C04B 28/02 106/67 |
| 4,466,833 A ‡ | 8/1984 | Spangle | .................. | C04B 28/26 106/60 |
| 5,996,693 A ‡ | 12/1999 | Heathman | ............... | C04B 28/04 106/64 |
| 6,715,553 B2 ‡ | 4/2004 | Reddy | ..................... | C09K 8/38 106/67 |
| 6,722,434 B2 * | 4/2004 | Reddy | ..................... | C04B 20/12 106/672 |
| 6,858,566 B1 * | 2/2005 | Reddy | ..................... | C04B 38/02 507/202 |
| 6,992,048 B2 ‡ | 1/2006 | Reddy | ..................... | C04B 20/12 166/30 |
| 7,156,175 B2 ‡ | 1/2007 | Reddy | ..................... | C09K 8/38 166/30 |
| 7,288,147 B2 ‡ | 10/2007 | Christensen | ............ | C04B 28/02 106/67 |
| 7,642,223 B2 ‡ | 1/2010 | Santra | ..................... | C09K 8/516 166/28 |
| 7,922,808 B2 ‡ | 4/2011 | Brower | ................... | C04B 28/02 106/71 |
| 8,689,871 B2 ‡ | 4/2014 | Khatri | ..................... | C04B 28/02 166/29 |
| 10,150,905 B1 | 12/2018 | Reddy | | |
| 10,259,985 B1 * | 4/2019 | Reddy | ..................... | C04B 38/02 |
| 2004/0168801 A1 ‡ | 9/2004 | Reddy | ..................... | C04B 20/12 166/292 |
| 2004/0221990 A1 * | 11/2004 | Heathman | ............... | C04B 22/04 166/292 |
| 2005/0126781 A1 * | 6/2005 | Reddy | ..................... | C04B 20/12 166/292 |
| 2005/0204960 A1 * | 9/2005 | Heathman | ............... | C04B 22/04 106/672 |
| 2014/0076204 A1 ‡ | 3/2014 | Brenneis | ............. | C04B 40/0092 106/71 |
| 2014/0131042 A1 ‡ | 5/2014 | Nguyen | ................... | C09K 8/80 166/28 |
| 2014/0318786 A1 ‡ | 10/2014 | Vidma | ................... | C09K 8/665 166/29 |
| 2017/0107420 A1 ‡ | 4/2017 | Terrier | ................... | C04B 28/02 |

FOREIGN PATENT DOCUMENTS

| | | |
|---|---|---|
| CN | 105859244 | 8/2016 |
| CN | 105859244 A ‡ | 8/2016 |

\* cited by examiner
‡ imported from a related application

*Primary Examiner* — Anthony J Green
(74) *Attorney, Agent, or Firm* — Fish & Richardson P.C.

(57) ABSTRACT

This document relates to settable, hydraulic, non-Portland foamed cement compositions comprising nitrogen gas-generating compositions used for loss circulation control.

3 Claims, 1 Drawing Sheet

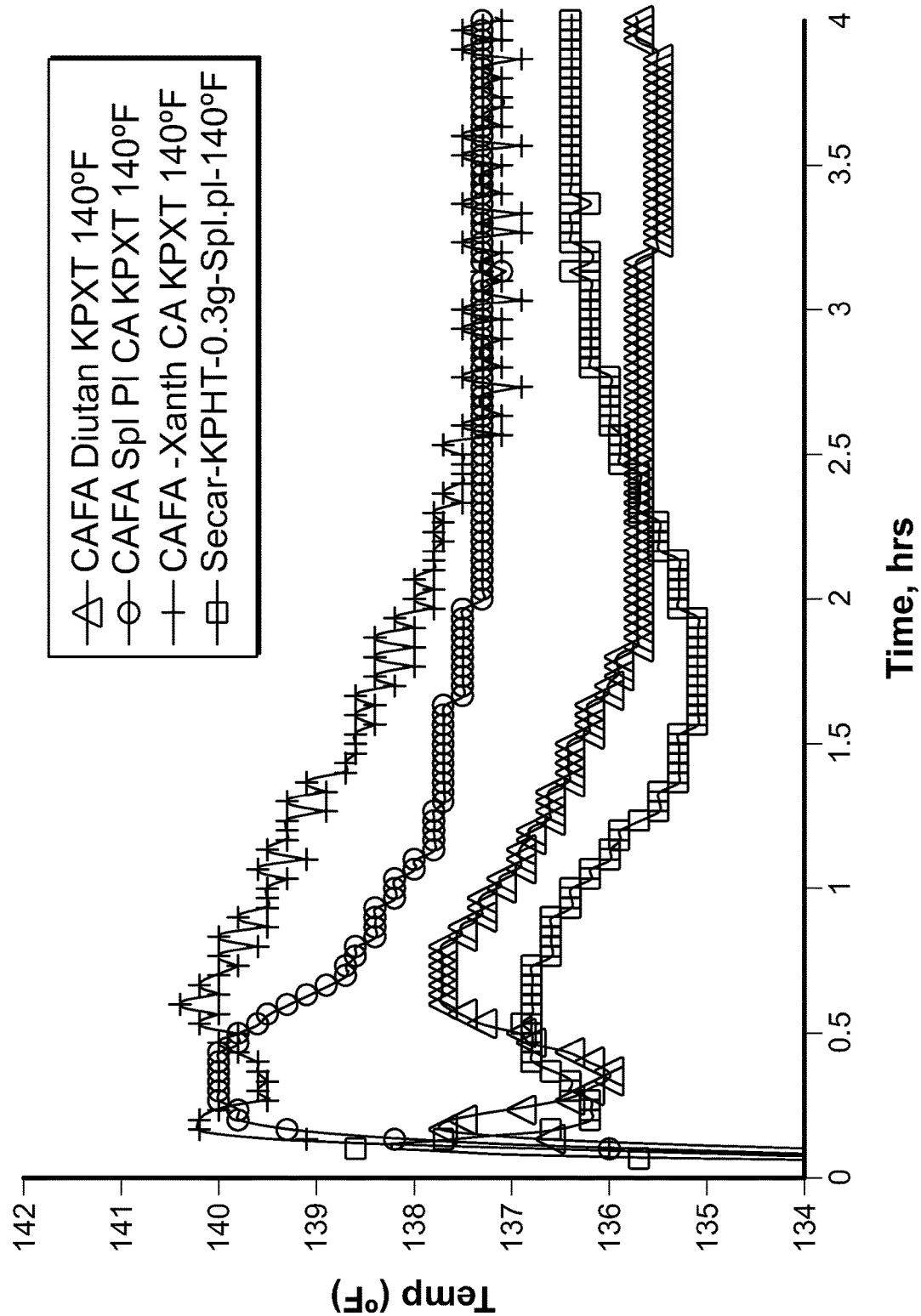

SETTABLE, FORM-FILLING LOSS CIRCULATION CONTROL COMPOSITIONS COMPRISING IN SITU FOAMED CALCIUM ALUMINATE CEMENT SYSTEMS AND METHODS OF USING THEM

CROSS-REFERENCE TO RELATED APPLICATION(S)

This application is a continuation of and claims the benefit of priority to U.S. patent application Ser. No. 15/879,179, filed on Jan. 24, 2018, now issued as U.S. Pat. No. 10,259,985 on Apr. 16, 2019, the contents of which are hereby incorporated by reference.

TECHNICAL FIELD

This document relates to settable, foamed hydraulic non-Portland cement compositions comprising a nitrogen gas-generating compound used for loss circulation control.

BACKGROUND

Natural resources such as gas, oil, and water in a subterranean formation are usually produced by drilling a well bore down to a subterranean formation while circulating a drilling fluid in the wellbore. Fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth.

One of the contributing factors may be lack of precise information on the dimensions of loss circulation areas, which can range from microfractures to vugular zones. Depending on the extent of fluid volume losses, loss circulation is classified as seepage loss, moderate loss, or severe loss. For oil-based fluids, losses of 10-30 barrels per hour are considered moderate, and losses greater than 30 barrels per hour are considered severe. For water-based fluids, losses between 25 and 100 barrels are considered moderate, and losses greater than 100 barrels are considered severe. For severe losses, the dimensions of the loss circulation zones cannot be estimated which makes it difficult to design loss circulation treatment pills based on the sized particles. The revenue loss due to loss circulation materials (LCM) problems extends into tens of millions of dollars.

Loss circulation treatments involving various plugging materials have been used to prevent or lessen the loss of fluids from wellbores. The ideal loss circulation treatment solution will have to be adaptable to any dimension or shape of the loss circulation zone. Thus, there is a need for a composition that can form-fill upon placement, irrespective of the shape and size of the thief zone.

SUMMARY

Provided herein are foamed cementitious compositions. The compositions are hydraulic non-Portland cementitious compositions that include calcium aluminate; a nitrogen gas-generating compound; an amine activator; and a foam surfactant. In some embodiments, the calcium aluminate comprises greater than or about 68.5% alumina and less than or about 31% calcium oxide.

In some embodiments of the cementitious compositions, the foam surfactant is selected from the group consisting of an alkyl sulfate salt with a $C_{12}$-$C_{14}$ carbon chain, a betaine, a hydroxysultaine, and combinations thereof. In some embodiments, the foam surfactant is cocoamidopropyl hydroxysultaine.

In some embodiments of the cementitious compositions, the nitrogen gas-generating compound is an azo compound. In some embodiments, the azo compound is azodicarbonamide. In some embodiments, the azo compound is about 1% to about 10% by weight of the calcium aluminate.

In some embodiments, the amine activator is selected from the group consisting of carbohydrazide (CHZ) and tetraethylenepentamine (TEPA). In some embodiments, the weight ratio of the azo compound to the amine activator is about 5:1 to about 1:5. In some embodiments, the amine activator is CHZ.

In some embodiments, the cementitious composition further includes a set retarder selected from the group consisting of hexametaphosphate, sodium borate, sodium citrate, citric acid, and an aminophosphonate.

In some embodiments, the cementitious composition further includes a viscosifier.

In some embodiments, the cementitious composition further includes a filler.

In some embodiments, the composition does not include an oxidizer.

In some embodiments, the composition does not include calcium silicates. In some embodiments, the composition is not Portland cement.

Also provided herein is a foamed cementitious composition that includes calcium aluminate comprising greater than or about 68.5% alumina and less than or about 31% calcium oxide; azodicarbonamide in an amount of about 1% to about 10% by weight of the calcium aluminate; an amine activator, wherein the weight ratio of the azo compound to the amine activator is about 5:1 to about 1:5; and a foam surfactant.

In some embodiments, the amine activator is selected from among carbohydrazide and TEPA.

In some embodiments, the cementitious composition further includes a viscosifier.

Also provided herein is a method of treating a loss circulation zone in a subterranean formation. In some embodiments, the method includes: a) forming a foamed cementitious composition that contains calcium aluminate; a nitrogen gas-generating compound; an amine activator; and a foam surfactant; and b) introducing the foamed cementitious composition into the loss circulation zone.

In some embodiments of the method, the nitrogen gas-generating compound is an azo compound. In some embodiments, the azo compound is about 1% to about 10% by weight of the calcium aluminate.

In some embodiments of the method, the amine activator is selected from the group consisting of carbohydrazide (CHZ) and tetraethylenepentamine (TEPA). In some embodiments, the weight ratio of the azo compound to the amine activator is about 5:1 to about 1:5.

DESCRIPTION OF DRAWINGS

The FIGURE shows gas generation in a series of cement compositions containing various viscosifiers.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used herein, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

As used herein, a "cement" can be a binder, for example, a substance that sets and can bind other materials together. Hydraulic cements (e.g., Portland cement, calcium aluminate cements) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water.

As used herein, a "cementitious composition" can refer to a hydraulic non-Portland cement composition. The non-Portland cementitious compositions provided herein are calcium aluminate based cements. The cementitious compositions provided herein exclude Portland cements. A "Portland cement" is a calcium silicate based hydraulic cement. Calcium aluminate cements and Portland cements are made in different manners. For example, a calcium aluminate cement contains calcium and aluminum and oxygen, while Portland cements contain calcium, silicon, aluminum and sulfur. A cementitious composition can also include additives. The cementitious compositions described herein can include water or be mixed with water. Depending on the type of cement, the chemical proportions, and when a cement composition is mixed with water, it can hydrate and set to form a single phase hard solid material.

As used herein, the term "set" can mean the process of becoming hard or solid by curing. Depending on the composition and the conditions, it can take just a few minutes up to 72 hours or longer for some cement compositions to initially set.

As used herein, a "retarder" can be a chemical agent used to increase the thickening time of a cement composition. The need for retarding the setting of a cement composition by extending the duration during which the cement composition remains as a pumpable fluid tends to increase with the depth of the zone to be cemented due to the greater time required to place the slurry in the zone of interest and complete the cementing operation, and to compensate the set acceleration effect of increased temperature on the setting of the cement. A longer thickening time at the design temperature allows for the longer pumping time that may be required.

The term "alkyl" as used herein can refer to straight chain and branched alkyl groups and cycloalkyl groups having from 1 to about 40 carbon atoms, 1 to about 20 carbon atoms, 1 to about 12 carbons or, in some embodiments, from 1 to about 8 carbon atoms. Examples of straight chain alkyl groups include those with from 1 to about 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "amine" as used herein can refer to primary, secondary, and tertiary amines having, e.g., the formula N(group)$_3$ wherein each group can independently be H or non-H, such as alkyl, aryl, and the like. Amines include, but are not limited to, RNH$_2$, for example, alkylamines, arylamines, alkylarylamines; R$_2$NH wherein each R is independently selected from, for example, dialkylamines, diarylamines, aralkylamines, heterocyclylamines and the like; and R$_3$N wherein each R is independently selected from, for example, trialkylamines, dialkylarylamines, alkyldiarylamines, triarylamines, and the like. The term "amine" also includes polyamines in which the amine contains more than amino functional group.

The term "amino group" as used herein can refer to a substituent of the form —NH$_2$, —NHR, -and NR$_2$, wherein each R is independently selected, and protonated forms of each. Accordingly, any compound substituted with an amino group can be viewed as an amine. An "amino group" within the meaning herein can be a primary, secondary, or tertiary amino group. An "alkylamino" group includes a monoalkylamino, dialkylamino, and trialkylamino group.

The term "room temperature" as used herein can refer to a temperature of about 15° C. to about 28° C.

As used herein, the term "polymer" can refer to a molecule having at least one repeating unit and can include copolymers.

The term "downhole" as used herein can refer to under the surface of the earth, such as a location within or fluidly connected to a wellbore.

As used herein, the term "fluid" can refer to liquids and gels, unless otherwise indicated.

As used herein, the term "drilling fluid" can refer to fluids, slurries, or muds used in drilling operations downhole, such as during the formation of the wellbore.

As used herein, the term "cementing fluid" can refer to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "subterranean material" or "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Compositions and Reaction Products Thereof

Provided in this disclosure are settable, hydraulic, non-Portland cement compositions, e.g., calcium aluminate based cement compositions, comprising nitrogen-gas generating compounds. The compositions described herein are in situ foaming compositions that include fast-setting calcium aluminate cement compositions. Calcium aluminate cement compositions typically contain variable calcium oxide and alumina molar ratios and hydrate rapidly in water to form high strength materials. The amount of alumina typically ranges from about 40% to about 80%, with the remaining content being calcium oxide. The hydrates formed, depending on the initial composition of anhydrous calcium aluminate, can include mixtures of $3CaO.Al_2O_3.6H_2O$ and $Al_2O_3.3H_2O$, which forms a cohesive mass of high strengths. The foamed cementitious compositions can form-fill upon placement, irrespective of the shape and size of the loss circulation zone, to cure loss circulation problems. The foamed compositions can set up to hard masses to withstand hydrostatic pressures from wellbore fluids without requiring extensive foam equipment that can involve cryogenic nitrogen and the associated machinery. Provided herein are calcium aluminate cement-based slurries that are foamed with in situ generated nitrogen gas. The gas is generated by a nitrogen gas-generating compound. In some embodiments, the compositions comprise an activator or accelerator compound that can accelerate generation of gas from the gas-generating compound. The cementitious compositions can also contain other components. For example, fillers such as flyashes can be used to reduce the content of calcium aluminate.

Provided in this disclosure is a foamed cementitious composition including calcium aluminate, a nitrogen gas-generating compound, and a foam surfactant. Also provided in this disclosure is a foamed cementitious composition that includes calcium aluminate, a nitrogen gas-generating compound, an amine activator, and a foam surfactant.

The foamed cementitious compositions provided herein are calcium aluminate based non-Portland cements. In some embodiments, the hydraulic foamed non-Portland cement compositions described herein include calcium aluminate cements which are a combination of calcium oxide, and alumina. Calcium aluminate cements are hydraulic cements that when mixed with water harden and set. Any calcium aluminate cement suitable for use in subterranean applications can be used in the compositions described herein. In some embodiments, the calcium aluminate cement can include a cement having an alumina concentration within the range of about 40% to about 80% of the weight of the calcium aluminate cement. For example, the cement can have an alumina concentration of about 40% to about 75%, about 40% to about 70%, about 40% to about 65%, about 40% to about 60%, about 40% to about 55%, about 40% to about 50%, about 40% to about 45%, about 45% to about 80%, about 45% to about 75%, about 45% to about 70%, about 45% to about 65%, about 45% to about 60%, about 45% to about 55%, about 45% to about 50%, about 50% to about 80%, about 50% to about 75%, about 50% to about 70%, about 50% to about 65%, about 50% to about 60%, about 50% to about 55%, about 55% to about 80%, about 55% to about 75%, about 55% to about 70%, about 55% to about 65%, about 55% to about 60%, about 60% to about 80%, about 60% to about 75%, about 60% to about 70%, about 60% to about 65%, about 65% to about 80%, about 65% to about 75%, about 65% to about 70%, about 70% to about 80%, or about 75% to about 80% of the calcium aluminate cement. Examples of suitable calcium aluminate cements include, but are not limited to, commercially available cements such as those available under the trade names SECAR® 51, SECAR® 60, SECAR® 71, SECAR® 712, SECAR® 80, and CIMENT FONDU®, cements commercially available from KERNEOS™ Aluminate Technologies, CA-14 and CA-270, commercially available from ALMATIS™ Premium Alumina. In some embodiments, the calcium aluminate cement is SECAR® 71.

In some embodiments, the calcium aluminate cement can contain one or more fillers. Suitable examples of fillers include, but are not limited to, fly ash, sand, clays, and vitrified shale.

In some embodiments, the nitrogen gas-generating compound included in the cementitious compositions described herein is an azo compound. In some embodiments the azo compound is a derivative of azodicarboxylic acid with the formula:

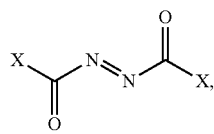

where X is independently selected from among $NH_2$, a monoalkylamino group, a dialkylamino group, OH, $O^-M^{n+}$ (where $M^{n+}$ is an alkali or alkaline earth metal), alkyl, aryl, or an alkoxy group. In some embodiments, the azodicarboxylic acid derivative is selected from an amide derivative, an ester derivative, and an alkali salt of the carboxylic derivative. In some embodiments, the nitrogen gas-generating azodicarboxylic acid derivative is azodicarbonamide (AZDC) with the structure:

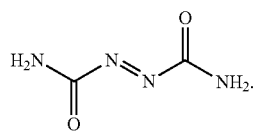

In some embodiments, the nitrogen gas-generating azodicarboxylic acid derivative is an ester represented selected from among diisopropyl azodicarboxylate (DIAD) and diethyl azodicarboxylate (DEAD) represented by the structures:

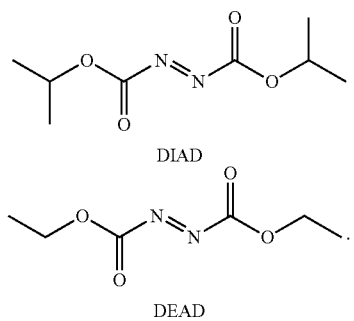

DIAD

DEAD

In some embodiments, the foamed cementitious composition includes a nitrogen gas-generating compound in an amount of about 0.1% to about 20% by weight of the calcium aluminate. For example, the nitrogen gas-generating compound can be about 1% to about 10% by weight of the calcium aluminate or about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, or about 20% by weight of the calcium aluminate.

In some embodiments, the amount of gas generated in the foamed solid cementitious composition is about 65% to about 90% of the foamed composition. For example, the amount of gas generated can be about 69% to about 85% of the foamed composition or about 69%, 70%, 71%, 72%, 73%, 74%, 75%, 76%, 77%, 78%, 79%, 80%, 81%, 82%, 83%, 84%, 85%, 86%, 87%, 88%, 89%, or about 90% of the foamed solid composition.

In some embodiments, the foam surfactant is selected from among an alkyl sulfate salt, an alpha-olefin sulfonate, a betaine, a hydroxysultaine, an amine oxide, and combinations thereof. In some embodiments, the alkyl sulfate salt has an alkyl chain that is a $C_{12}$-$C_{14}$ carbon chain, such as sodium dodecyl sulfate. In some embodiments, the foam surfactant is cocoamidopropyl hydroxysultaine. In some embodiments, the foam surfactant is a combination of an alkyl sulfate salt and cocoamidopropyl hydroxysultaine.

In some embodiments, the foam surfactant is present in an amount of about 30 wt % to about 50 wt % in an aqueous solution. In some embodiments, the foam surfactant is in an aqueous solution containing a water soluble alcohol, for example isopropyl alcohol. In some embodiments, the foam surfactant is about 30% to about 50% by weight in the aqueous solution. For example, the foam surfactant can be about 30%, 35%, 40%, 45%, or about 50% by weight in the aqueous solution. In some embodiments, the foam surfactant is a 48 wt % solution of cocoamidopropyl hydroxysultaine in water.

In some embodiments, the surfactant or combination of surfactants is added in about 1% to about 10% by volume of the mix water used to make the cement composition. In some embodiments, the surfactant solution is added in about 2%, 3%, 4%, 5%, 6%, 7%, 8%, 9%, or about 10% by volume of the mix water used to make the cement composition.

In some embodiments, the foamed cementitious composition includes an amine activator or accelerator compound. The amine activator/accelerator compound can be used to accelerate the generation of gas from the nitrogen gas-generating compound. In some embodiments, the amine activator is selected from among a hydrazide, a hydrazine, a semi-carbazide, and an ethyleneamine. Examples of suitable ethyleneamines include ethylenediamine (EDA), diethylenetriamine (DETA), triethylenetetramine (TETA), and tetraethylenepentamine (TEPA). In some embodiments, the amine activator is TEPA. In some embodiments, the amine activator is a hydrazine salt. In some embodiments, the amine activator is hydrazine sulfate. In some embodiments, the amine accelerator compound is a hydrazide with the structure:

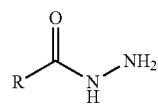

In some embodiments, the hydrazide is carbohydrazide (CHZ) and R is $NHNH_2$. In some embodiments, the amine activator is a semi-carbazide with the structure:

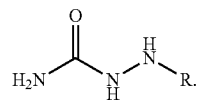

In some embodiments, the semi-carbazide is an unsubstituted semi-carbazide and R is H (i.e., hydrazinecarboxamide). In some embodiments, the hydrazide is p-toluenesulfonyl hydrazide.

In some embodiments, the composition comprises a nitrogen gas-generating compound that is an azo compound and an amine activator. In some embodiments, the compositions described herein include an azo compound and a hydrazide. In some embodiments, the composition comprises AZDC and CHZ. In some embodiments, the composition comprises AZDC and TEPA. In some embodiments, the composition comprises AZDC and hydrazine sulfate.

In some embodiments, the weight ratio of the nitrogen gas-generating compound to the amine activator is about 20:1 to about 1:20, such as about 10:1 to about 1:10, or about 5:1 to about 1:5. For example, the weight ratio of the nitrogen gas-generating compound to the amine activator can be about 5:1 to about 1:5, about 5:1 to about 1:4, about 5:1 to about 1:3, about 5:1 to about 1:2, about 5:1 to about 1:1, or about 5:1, 4:1, 3:1, 2:1, 1:1, 1:2, 1:3, 1:4, or about 1:5. In some embodiments, the nitrogen gas-generating compound is an azo compound. In some embodiments, the azo compound is AZDC.

In some embodiments, the foamed cementitious composition includes a set retarder. In some embodiments, set times of calcium aluminate cement at a given temperature can be controlled by set retarders. In some embodiments, the set retarder is selected from among a citrate salt, citric acid, sodium hexametaphosphate, aminomethylene organophosphonates, and sodium borate salts. In some embodiments, the set retarder is selected from among sodium hexametaphosphate (SHMP), sodium borate, sodium citrate, citric acid, sodium tetraborate and the pentasodium salt of amino tri(methylene phosphonic acid) ($Na_5ATMP$). An exemplary $Na_5ATMP$ salt includes Dequest 2006®, available as a 40% solution from Italmatch Chemicals (Red Bank, N.J.). In some embodiments, the set retarder is SHMP.

In some embodiments, the set retarder is present in an amount of 0.5 wt % to about 10 wt % of the calcium aluminate, or about 1 wt %, 2 wt %, 3 wt %, 4 wt %, 5 wt %, 6 wt %, 7 wt %, 8 wt %, 9 wt %, or about 10 wt % of the calcium aluminate. The amount of retarder is determined by lab experimentation by measuring the thickening times using a conventional equipment, such as a Cement Consistomer, at temperature and pressure conditions of the subterranean formation.

In some embodiments, the foamed cementitious composition includes a viscosifier, such as a polymeric viscosifier. In some embodiments, the viscosifier can prevent settling of the calcium aluminate and/or the azo initiator. In some embodiments, the viscosifier can improve foam stability. In some embodiments, the viscosifier is selected from among xanthan, diutan and vinylphosphonic acid-grafted hydroxyethyl cellulose (HEC-VP). An exemplary HEC-VP includes Special Plug™, available as a 30 wt % polymer slurry in a non-aqueous polyol (Special Products Division of Champion Chemicals, TX). In some embodiments, the viscosifier is xanthan. In some embodiments, the viscosifier is HEC-VP.

In some embodiments, the viscosifier is present in an amount of about 0.1 wt % to about 5 wt % of the mix water used to prepare the cement composition. In some embodiments, the viscosifier is in an aqueous solution. For example, the viscosifier can be about 0.1% to about 5% by weight of the mix water, such as about 0.1%, 0.5%, 0.6%, 0.7%, 0.8%, 0.9%, 1%, 2%, 2.5%, 3%, 4%, or about 5% by weight of the mix water. In some embodiments, the viscosifier is diutan and is about 0.5 wt % of the mix water. In some embodiments, the viscosifier is xanthan and is about 0.6 wt % of the mix water. In some embodiments, the viscosifier is HEC-VP and is about 0.8 wt % of the mix water. In some embodiments, the mix water solution containing the viscosifier has a pH of 1.6. In some embodiments, the mix water solution containing the viscosifier has a pH of about 6-7.

Additional components that can be added to the cementitious compositions described herein include dispersants, set accelerators, settling prevention additives, and the like, cement extender/filler materials such as flyashes, slag, silica and sand, mechanical property modifiers such as fibers, latex materials, and rubber particles.

Also provided in this disclosure is a foamed cementitious composition that includes calcium aluminate, azodicarbonamide, a hydroxysultaine, SHMP, xanthan, and an amine activator selected from among CHZ and TEPA. In some embodiments, the amine activator is CHZ. In some embodiments, the amine activator is TEPA.

Method of Treating a Subterranean Formation

Additionally, provided in this disclosure is a method of treating a loss circulation zone in a subterranean formation. The method includes forming a foamed cementitious composition described herein, and introducing the foamed cementitious composition into the subterranean formation. In some embodiments, the foamed cementitious composition is placed within the loss circulation zone via a wellbore. In some embodiments, the composition includes calcium aluminate, a nitrogen gas-generating compound, and a foam surfactant. In some embodiments, the composition includes calcium aluminate, a nitrogen gas-generating compound, an amine activator, and a foam surfactant.

In some embodiments, the nitrogen gas-generating compound is an azo compound. In some embodiments, the azo compound is about 1% to about 10% by weight of the calcium aluminate.

In some embodiments, the composition includes an amine activator selected from among carbohydrazide (CHZ), tetraethylenepentamine (TEPA), and hydrazine sulfate. In some embodiments, the weight ratio of the azo compound to the amine activator is about 5:1 to about 1:5.

The cementitious compositions described herein can be prepared by mixing the cementitious solids with mix water which can be fresh water, sea water, or brine. The mix water can be premixed with gas generating materials, retarders or other additives intended for slurry or set cement property manipulation to meet the requirements. Dry cement powders, or blends mixed with solid additives are added to mix water with agitation. Liquid additives are injected into the mix water or into the slurry during or after slurry preparation or while pumping the slurry downhole. Such liquid additives may include foaming compositions, foaming surfactants, or retarders and the like. After placing the foamed composition in the loss circulation zone, the composition is typically allowed to set for at least 24 hours before conducting further operations such as drilling, cementing, or wellbore cleanup.

Also provided herein is a method of servicing a loss circulation zone. In some embodiments, the loss circulation zone is fluidly connected to a wellbore. The method includes providing a foamed cementitious composition including calcium aluminate; a nitrogen gas-generating compound; an amine activator; and a foam surfactant, within a portion of a subterranean formation containing the loss circulation zone.

In some embodiments, the composition is introduced into a subterranean formation containing the loss circulation zone using a pump.

In some embodiments, the cement compositions used herein are not designed for the purpose of primary cementing operations, wherein the cement slurry is placed behind a casing and allowed to set to form annular sealant between two casing strings or a casing and formation.

EXAMPLES

A series of calcium aluminate-based cements were prepared and tested as described in Examples 1 and 2. The compositions were prepared by exposing anhydrous calcium aluminate to water to form slurries of calcium aluminate hydrates.

Other components of the compositions included: azodicarbonamide; an amine activator/accelerator compound, including carbohydrazide, tetraethylenepentamine (TEPA), and hydrazine sulfate; a foaming surfactant, including alky sulfate salts, in which the alkyl group has a $C_{12}$-$C_{14}$ carbon chain, a betaine, a hydroxysultaine, or a combination of surfactants; a set retarder, including sodium hexametaphosphate (SHMP), sodium citrate, sodium tetraborate, and pentasodium salt of amino tri(methylene phosphonic acid) ($Na_5$ATMP) (Dequest 2006®, a 40% solution from Italmatch USA, Red Bank, N.J.); and a polymeric viscosifier, including xanthan, diutan, and vinylphosphonic acid-grafted cellulose (HEC-VP) (available as a 30 wt % polymer slurry in a non-aqueous polyol available from Special Products Division of Champion Chemicals, Texas under the trade name Special Plug). The diutan and xanthan solutions were prepared as 0.5 wt % and 0.6 wt % solutions, respectively, by dissolving the polymer is water with mild agitation to minimize shear induced polymer chain scission. The Special Plug product solution was prepared by stirring 12.5 mL of the polymer slurry in 400 mL water, followed by addition of 1.25 mL concentrated hydrochloric acid to obtain a 0.9% polymer solution with a pH of 1.6.

Example 1—Cement Compositions Containing a Gas Generating Compound and Various Activators To 66 g of a 0.8 wt % solution of xanthan, 66 g of calcium aluminate containing ≥68.5% alumina and ≤31% CaO (sold under the trade name SECAR 71, Kerneos, VA), 2 g sodium hexametaphosphate (SHMP), 2 g azodicarbonamide, and 2.6 mL of a cocoamidopropyl hydroxysultaine solution (48 wt % in water) were added and stirred to obtain a homogeneous suspension. The density of the slurry was 1.47 g/cc (12.2 pounds per gallon). The slurry was divided into four 26 g (18 mL) batches (each batch contained 0.37 g azodicarbonamide) and placed in four Humboldt 2"×4" cardboard cylinder molds. Gas generation activators (carbohydrazide, tetraethylene pentamine (TEPA), and carbohydrazide/encapsulated potassium peroxysulfate) were added to three of the four cylinders. Into one cylinder, 0.38 g carbohydrazide was added; into a second cylinder, 0.38 g TEPA was added; and into a third cylinder, a mixture of 0.38 g carbohydrazide and 0.38 g encapsulated potassium peroxysulfate ($K_2S_2O8$) was added. The fourth cylinder was used as a control sample. The cylinders were kept in a water bath thermostated at 140° F. for 3 days. The volumes of the foamed solids were measured by equivalent volumes of water to match the volumes of the solid. The results are shown in Table 1.

TABLE 1

| Composition | Activator | Activator amount (g) | Final vol. (mL) | Gas vol. (mL) | % gas vol. in set cement |
|---|---|---|---|---|---|
| 1a | None | 0 | 56 | 38 | 68 |
| 1b | Carbohydrazide (CHZ) | 0.38 | 80 | 62 | 78 |
| 1c | TEPA | 0.38 | 58 | 40 | 69 |
| 1d | CHZ + encapsulated $K_2S_2O_8$ | 0.38 + 0.38 (0.76) | 80 | 62 | 78 |

The results showed that amine compounds functioned as activators for azodicarbonamide and increased generation of nitrogen gas. The results also showed that oxidizer ($K_2S_2O_8$) did not increase the gas amounts compared to the amine activator by itself.

Example 2—Cement Compositions Containing Various Viscosifiers

Three viscosified mixing fluids that contained either 0.6 wt % xanthan, 0.5 wt % diutan, or 0.8 wt % HEC-VP solutions were prepared. The HEC-VP solution had a pH of 1.6 and the other solutions had a pH between 6-7. To 13 mL of each viscosified solution, 0.43 g azodicarbonamide, 0.43 g carbohydrazide, 0.40 mL cocoamidopropyl hydroxysultaine, and 0.15 citric acid were added with stirring to obtain a homogeneous liquid blend, and preheated to 140° F. in thermostated oil baths connected to Brookfield viscometers.

A solid blend (referred to as CAFA in the FIGURE) of 30 g calcium aluminate (SECAR 71) and 31 g Class F flyash and 3.0 g of sodium hexametaphosphate (SHMP) was prepared and divided into three equal batches of 21 g each. To each batch, 0.35 g of potassium persulfate was added. The solid blend was added to each liquid mixture with stirring, then placed in three centrifuge tubes. Heat evolution was determined by monitoring the temperature increase measured with a Brookfield viscometer under quiescent conditions.

As shown in the FIGURE, the first exotherm, observed within 10-15 minutes of all reactions, corresponded to gas generation confirmed by visual observations. The second exotherm, observed in the 30-45 min range, may reflect heat of hydration of calcium aluminate. The separation between the first and second exotherm was less distinct in the HEC-VP fluid blend, possibly due to the low pH of the fluid.

While xanthan and diutan showed distinct exotherms, corresponding to exothermic gas formation within 15 minutes, followed by a second exotherm at about 40 min., corresponding to hydration of calcium aluminate, HEC-VP showed the exotherms for both gas generation and cement hydration were not well separated. This difference may be due to the different pH values of the mix water containing the HEC-VP solution vs. the mix water containing xanthan or diutan. The low pH value of the mix water appeared to have made SHMP less effective as a retarder.

By using suitable retarders, the foamed slurry could be maintained in the flowable/pumpable phase over the desired placement duration by delaying the calcium aluminate hydration.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A foamed cementitious composition, comprising:
    calcium aluminate comprising greater than or about 68.5% alumina and less than or about 31% calcium oxide;
    an azo compound in an amount of about 1% to about 10% by weight of the calcium aluminate;
    an amine activator comprising an ethyleneamine, wherein the weight ratio of the azo compound to the amine activator is about 5:1 to about 1:5; and
    a foam surfactant.

2. The composition of claim 1, wherein the ethyleneamine comprises tetraethylenepentamine (TEPA).

3. The composition of claim 1, further comprising a viscosifier, wherein the azo compound comprises azodicarbonamide, and wherein the foam surfactant comprises an alky sulfate salt or a betaine, or both.

* * * * *